(12) United States Patent
Keller et al.

(10) Patent No.: US 9,819,990 B2
(45) Date of Patent: Nov. 14, 2017

(54) REMOTE CONTROL PROGRAMMING USING IMAGES

(71) Applicant: THOMSON LICENSING, Issy de Moulineaux (FR)

(72) Inventors: Anton Werner Keller, Arni (CH); Roger Dominik Bozzini, Schaffhausen (CH)

(73) Assignee: Thomson Licensing (FR)

( * ) Notice: Subject to any disclaimer, the term of this patent is extended or adjusted under 35 U.S.C. 154(b) by 0 days.

(21) Appl. No.: 14/784,083

(22) PCT Filed: May 20, 2013

(86) PCT No.: PCT/IB2013/000981
§ 371 (c)(1),
(2) Date: Oct. 13, 2015

(87) PCT Pub. No.: WO2014/188227
PCT Pub. Date: Nov. 27, 2014

(65) Prior Publication Data
US 2016/0073151 A1    Mar. 10, 2016

(51) Int. Cl.
*H04N 21/422* (2011.01)
*H04N 21/41* (2011.01)
(Continued)

(52) U.S. Cl.
CPC ......... *H04N 21/42226* (2013.01); *G06K 9/46* (2013.01); *H04N 5/4403* (2013.01);
(Continued)

(58) Field of Classification Search
CPC ....... H04N 21/42208; H04N 21/42222; H04N 21/42225; H04N 21/44008;
(Continued)

(56) References Cited

U.S. PATENT DOCUMENTS

| 5,611,038 A | 3/1997 | Shaw et al. |
| 5,886,697 A | 3/1999 | Naughton et al. |

(Continued)

FOREIGN PATENT DOCUMENTS

| EP | 1562328 | 8/2005 |
| EP | 1863275 | 12/2007 |

(Continued)

OTHER PUBLICATIONS

Kim et al, "An Universal Remote Controller with Haptic Interface for Home Devices," 2010 Digest of Technical Papers, International Conference on Consumer Electronics (ICCE 2010), Las Vegas, Nevada, Jan. 9-13, 2010, IEEE Consumer Electronics Society, Jan. 9, 2010, pp. 209-210.

*Primary Examiner* — Jefferey F Harold
*Assistant Examiner* — Sean Haiem
(74) *Attorney, Agent, or Firm* — Jack Schwartz & Associates, PLLC

(57) ABSTRACT

Imaging capabilities of a remote control are leveraged to automatically identify a remotely controllable device and program the remote control accordingly. The remote control uses its built-in image device to obtain an image of a remotely controllable device. The image is processed and compared to a database to determine the specific type of device. Other variations include information of a location of the remote control and/or a location of a controllable device to facilitate in determining and controlling a device.

9 Claims, 6 Drawing Sheets

(51) Int. Cl.
*H04N 21/44* (2011.01)
*G06K 9/46* (2006.01)
*H04N 5/44* (2011.01)
*H04N 21/4223* (2011.01)

(52) U.S. Cl.
CPC ..... *H04N 21/4126* (2013.01); *H04N 21/4223* (2013.01); *H04N 21/42208* (2013.01); *H04N 21/42222* (2013.01); *H04N 21/42225* (2013.01); *H04N 21/44008* (2013.01); *H04N 2005/4408* (2013.01); *H04N 2005/4435* (2013.01)

(58) Field of Classification Search
CPC ......... H04N 21/42226; H04N 21/4126; H04N 5/4403; H04N 21/4223; H04N 2005/4408; H04N 2005/4435; G06K 9/46
See application file for complete search history.

(56) References Cited

U.S. PATENT DOCUMENTS

| | | | |
|---|---|---|---|
| 6,028,537 | A | 2/2000 | Suman et al. |
| 7,005,979 | B2 | 2/2006 | Haughawout et al. |
| 7,046,185 | B2 | 5/2006 | Griesau et al. |
| 7,106,209 | B2 | 9/2006 | Mui |
| 7,363,028 | B2 | 4/2008 | De Clerq et al. |
| 7,562,128 | B1 | 7/2009 | Caris et al. |
| 7,671,758 | B1 | 3/2010 | Seidel et al. |
| 8,031,270 | B1 | 10/2011 | Wisniewski et al. |
| 8,180,373 | B2 | 5/2012 | De Clerq et al. |
| 8,194,191 | B2 | 6/2012 | Van Duyn et al. |
| 2003/0141987 | A1 | 7/2003 | Hayes |
| 2005/0289224 | A1* | 12/2005 | Deslippe ............... H04L 67/125 709/208 |
| 2006/0143572 | A1 | 6/2006 | Scott et al. |
| 2007/0061022 | A1* | 3/2007 | Hoffberg-Borghesani ........................ G05B 19/0426 700/83 |
| 2007/0296604 | A1* | 12/2007 | Koyata ................ G06F 3/0238 340/4.3 |
| 2009/0138805 | A1* | 5/2009 | Hildreth ............ G06K 9/00335 715/745 |
| 2011/0037609 | A1* | 2/2011 | Kim .................... G06F 3/04847 340/12.22 |
| 2011/0037851 | A1* | 2/2011 | Kim .................... G06F 3/04847 348/143 |
| 2011/0093799 | A1* | 4/2011 | Hatambeiki .......... G08C 17/02 715/763 |
| 2011/0301722 | A1* | 12/2011 | Sato ....................... G08C 17/02 700/17 |
| 2012/0105447 | A1 | 5/2012 | Kim |
| 2013/0279697 | A1* | 10/2013 | Garcia Morchon ..... G09C 5/00 380/255 |
| 2014/0156883 | A1* | 6/2014 | Bowles .................. G06F 13/10 710/33 |
| 2014/0267934 | A1* | 9/2014 | Hardin ................ H04N 21/654 348/734 |

FOREIGN PATENT DOCUMENTS

| | | |
|---|---|---|
| EP | 2337353 | 6/2011 |
| WO | WO2012112216 | 8/2012 |

\* cited by examiner

REMOTE CONTROL PROGRAMMING USING IMAGES

BACKGROUND

People tend to have an increasing number of devices in their homes that are controlled by different remote controls. Several companies offer remote controls for controlling multiple devices from the same manufacturer. For people with devices from different brands, several types of universal remote controls are on the market. However, the user has to program the universal remote control for each of their devices. When using such a remote control, each device has to be selected via a selection button to indicate which device is to be controlled.

SUMMARY

A universal remote control is allocated to several devices without using selection buttons to change the operational controls of the different devices. This is accomplished by a remote control with a built-in camera and other sensing elements. This enables the remote control to be programmed for a remotely controllable device by simply taking a photograph of the new device. The photograph allows the remote control to automatically identify the device through software and/or database lookup tables. By using visual recognition, a device is controlled by merely pointing the remote control at the device. There is no need to use a selection button to make the remote control aware of which device needs to be controlled.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, but however, a few of the various ways in which the principles of the subject matter can be employed, and the subject matter is intended to include all such aspects and their equivalents. Other advantages and novel features of the subject matter can become apparent from the following detailed description when considered in conjunction with the drawings.

DETAILED DESCRIPTION

Figure 1:
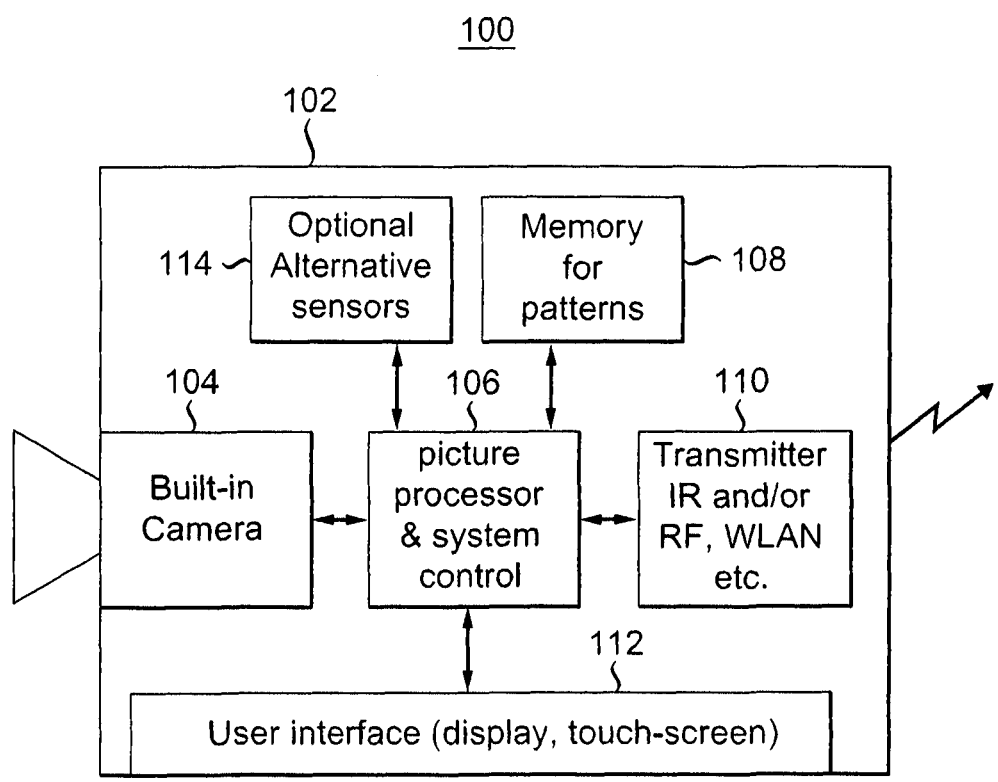
FIG. 1 is an example of a remote control system with a built-in image device.

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details. In other instances, well-known structures and devices are shown in block diagram form in order to facilitate describing the embodiments.

When provided by a processor, functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting instances and embodiments of the invention are intended to encompass both structural and functional equivalents. Additionally, it is intended that such equivalents include both currently known equivalents as well as equivalents developed in the future (i.e., any elements developed that perform the same function, regardless of structure).

A universal remote control (RC) needs to be customized by a user before it is able to control other devices. In the past, this has been accomplished by entering a key-number associated with the devices to be controlled. Smarter RCs have an alpha numeric keypad and a brand and a model name can be entered directly. Another type of method is the so called "learning mode," where the universal RC directly records the transmitted information from the original RC.

Disclosed herein is an RC that a user can use to take an image of a device to be controlled with a built-in image device such that the desired device to be remotely controlled is recognized by using an internal and/or external database (e.g., in the "cloud", via the Internet). If the recognition is not successful, the RC requests the user to take another image, possibly of a more significant detail, a type plate and/or a front-page of a user manual or the like. Even a piece of paper containing a name and model of a device can lead to a successful recognition allowing a correct set of operational control commands to be provided to the RC.

A remote control system 100 with a built-in image device (e.g., a photo camera, video camera, infrared camera, etc.) 104 is illustrated in FIG. 1, depicting elements for recognition and controlling of an RC 102. The image device 104 can be an existing element of an RC system (e.g., the RC can be a smart phone with RC capable software, etc.). The RC 102 contains the image device 104 to provide visual recognition of remotely controlled devices. Next to the image device 104, the RC 102 includes a processing unit 106, some memory 108 (e.g., EPROM) and a transmitter 110 (e.g., infrared (IR) and/or radio frequency (RF)). Infrared is used for line of sight control while radio frequencies tend to be used when line of sight is not available. The processor 106 processes images received from the image device 104 to facilitate in identifying a device for programming the RC 102 and/or for recognizing which device is to be controlled by the RC 102. The image device 104 permits controlling different devices with less frustration than with previous techniques. This includes ways of programming (customizing a universal RC) and ways of distinguishing between different devices to be controlled by a single RC.

The image device 104 can be a single frame image device such as, for example, a photo camera and/or it can be a multi-image device such as, for example, a video camera and the like. If the image device 104 is capable of multi-images, a single frame can be selected (e.g., best image, etc.) to be used in device determination. It is also possible to use more than one image during the determination process. The image device 104 can also include capturing frequencies outside of the human range of perception such as, for example, IR images. Heat images can also be used for identification of a device (e.g., power consumption along with location of power and amplifier components can be used to determine which unit is the remotely controllable device, etc.).

The memory 108 can be used to store patterns and/or images from the image device 104 used for recognition. This allows the RC 102 to quickly identify a device without the need for an external connection (e.g., a wireless connection to the Internet to retrieve information and the like). A user interface 112 can be included that can consist of, for example, buttons, indicators and/or a touch screen and the like with feedback capabilities. It can also contain a display to provide the user with a selection of possible RC identifications if more than one device could be a possibility based on an image (e.g., model with/without Ethernet connection, same model but with various possible firmwares, etc.). Optionally, alternative/additional sensors 114 and/or a network connection capability can be provided. The network connection capability can include wired and/or wireless connections to, for example, a local area network (LAN), Bluetooth and/or a wide area network (WAN) and the like.

Figure 2:
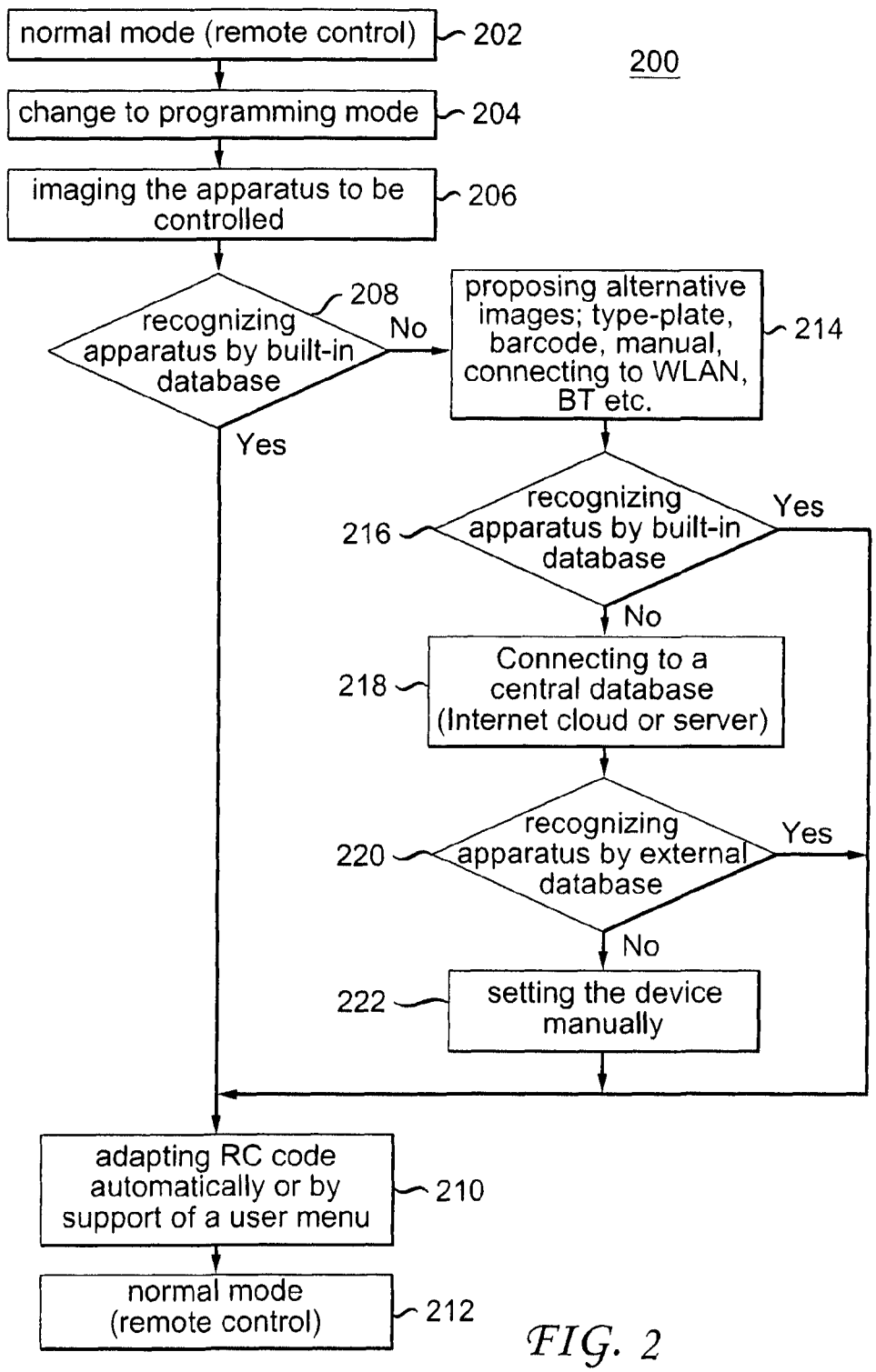
FIG. 2 depicts a flow diagram of a method of recognizing and programming a remote control.

FIG. 2 depicts a method 200 of a recognition and programming cycle for a remote control. The method 200 starts with the remote control in normal operational control mode 202. Programming mode is then selected on the RC 204. An image is then taken of a device that is to be controlled by the RC 206. The RC attempts to recognize the device based upon the image and/or images taken by the RC 208. If the device is recognized, the RC code for controlling the device is adapted automatically and/or with the assistance of a user menu and the like 210. The RC then returns to normal operational control mode (e.g., RC controlling mode as opposed to RC programming mode) 212.

If the device is not recognized by using the image, alternative images can be suggested to a user via the RC device 214. These alternative image views can include, but are not limited to, images of a type plate, a barcode and/or a manual page and the like. Likewise, if the device is not recognized by the RC, it can take advantage of the built in wireless facilities and try to connect and thus recognize the device getting a full identification via a dialog with the device or is able to extract some useful information from generally broadcasted communication by the device and a multimedia system/server or a cloud service (e.g., via DNLA, Internet or likewise) 214. This could be among other information a device type (TV, recorder, DVD player etc.), a company's identifier or a MAC address. This additional information can be used solely or in combination with others (including the images taken) for identifying the device. This can include, but is not limited to, connecting to an Internet database, connecting to a remote server of a manufacturer and/or connecting to a remote database and the like 218. The connection method can include, but is not limited to, Wi-Fi, Bluetooth and/or wired connection and the like. If the image is recognized using a built-in database to the RC 216, the RC control code is adapted 210 and it returns to a normal control mode 212. If, however, the built-in database does not yield a result 216, a connection can be made to an external database (e.g., Internet cloud, remote server, etc.) 218. If recognition is accomplished via the external database 220, the RC control code is programmed for the device 210 and the RC returns to normal control mode 212. If both the internal and external database fail to provide recognition of the device 220, the RC can be set manually by the user 222.

Figure 3:
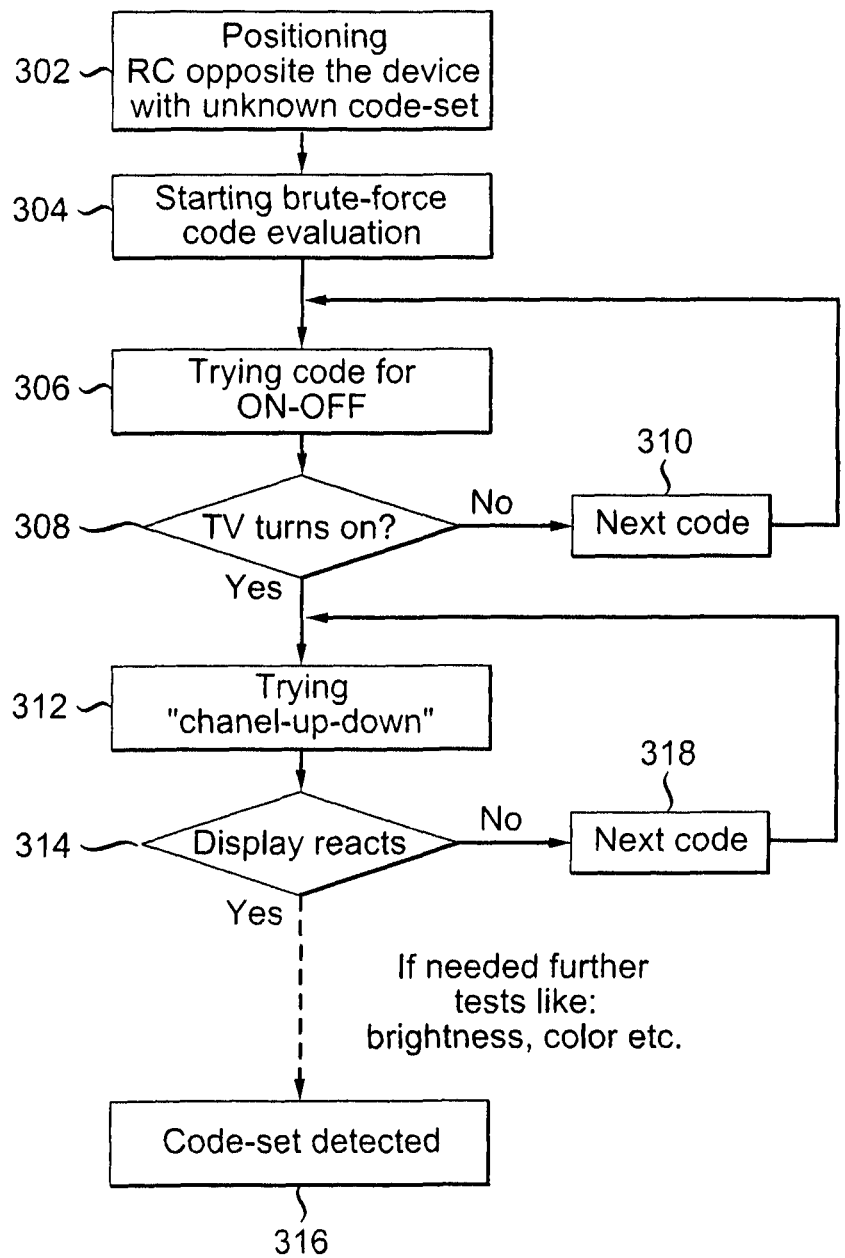
FIG. 3 is a flow diagram of a method of brute force programming of a remote control.

An alternative way of programming a device such as, for example, a television can be done in a "brute force" manner as shown in the example method 300 in FIG. 3. That is, the RC is placed such that the image device points towards the TV set 302. The RC goes through all codes 304 available until the TV turns on 306 (recognized by the image device) 308, 310 followed by checking further typical codes like, for example, turning off, "channel up/down" 312, brightness control etc. automatically. If the display reacts 314, the code set is detected 316. If not, another code is tried 318 until the display reacts 314. Even the audio can be checked if the RC contains an alternative sensor such as a microphone (usually a required sensor for smart phones to operate as telephones).

It is also possible that a device that a user desires to control has a communication method that allows the RC to communicate directly with the device. This can be, for example, a Bluetooth connection, a LAN connection (such as, e.g. Apple's Airplay) and the like. This enables the RC to directly identify the device without requiring image identification.

Once the RC has recognized devices in a room and the user is ready to control those devices, an image device of the RC is used again to determine which device the RC is being used to control. For example, to control a television, the RC is aimed at that device and the device is recognized as the TV. The respective code is transmitted to control the TV. For controlling the DVD-player, the RC is aimed at the DVD player and so on. Those devices are recognized either by the pattern that was used for the programming and/or by a visual characteristic (design) that is stored in the internal and/or external database. If the TV was not recognized in the programming step, a "link-step" is done to link the model with the image that was not identified. It is more difficult to recognize a brand and model from a picture than to detect that the RC is aimed at a television.

To increase detectability, certain patterns can be added to a front panel of a device either by the manufacturer and/or the user. Those patterns can be a product's name, a label and/or a design element that distinguishes it from other products. Those elements do not strictly need to be visible to the human eye (e.g., ultraviolet and/or infrared elements). It is clear to one skilled in the art that additional channels like Wi-Fi and/or Bluetooth can support detecting and distinguishing devices.

To make the RC more flexible, an image can be allocated to a device either automatically and/or via input from a user. Thus, the RC can include a mapping mode and/or an application mode. During the mapping mode, the user pairs an image (e.g., a view, scenery or even a movement in scenery) with an apparatus and/or model and the like. The user can allocate certain patterns to certain devices. That means the user can point at anything in a room (e.g., a picture on the wall, a cupboard, scenery and/or the TV-newspapers and the like) and allocate it to an apparatus recognized earlier.

Figure 4:
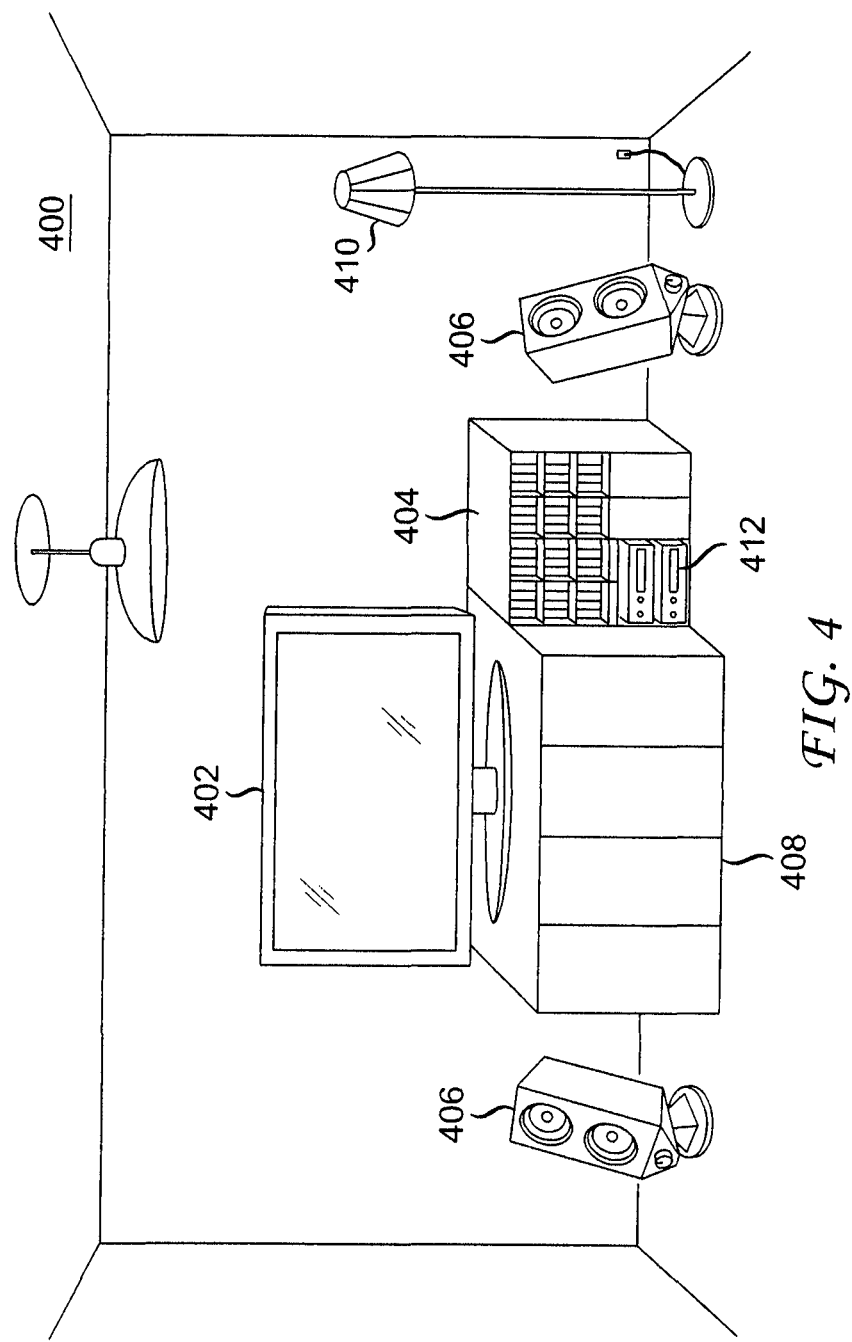
FIG. 4 illustrates a typical room with different devices that can be controlled by a remote control.

For daily use, the application mode can be selected. Whenever the RC is pointed to an apparatus and/or item, the RC evaluates the appropriate code-set by comparing the current pattern with the stored patterns in the memory. Movements of objects and images and/or changes in scenery are alternative "patterns" to be allocated to a device and/or even a command for that device. Usually it is not the objects moving, it is the RC that is moved from one image to another. FIG. 4 illustrates a typical room 400 with different devices that can be controlled by a remote control. A good choice of patterns can be parts of the room you are living in like: a television 402 sitting on a cupboard 408, a CD-collection 404, speakers 406, a DVD player and amplifier 412, a radio (not shown), and/or just something particular like a lamp 410 and the like. When images are detected, a user can receive feedback for a successful recognition from an indicator placed on the RC and/or the device to be controlled. It might also be advantageous if feedback appears on a display (e.g., a touch screen, LCD, etc.) of the remote control which depicts a chosen device in symbol and/or "real" form. If there is some doubt as to the device, the remote control can display both devices and the user can manually distinguish between them.

Figure 5:
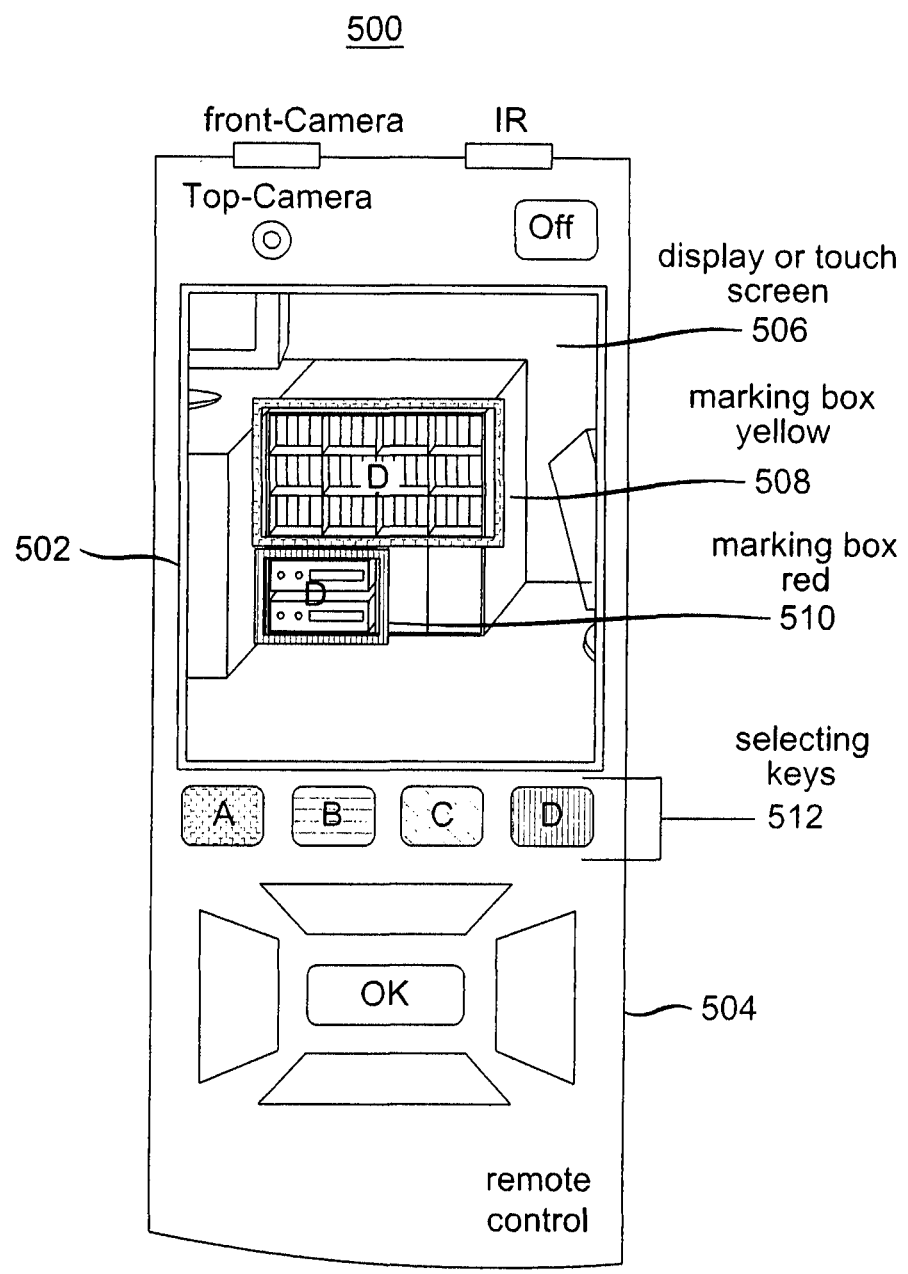
FIG. 5 shows a screen of a remote control with a display for selecting items.

TABLE 1 below and FIG. 5 are an example of how recognition and allocation can look like on a sophisticated RC (e.g., a smart phone/mobile device and the like).

TABLE 1

Device Allocation

| What device: | Object of apparatus or model recognition | Allocated object |
|---|---|---|
| TV-set | TV front & logo | TV-set |
| Radio | operating manual | Speakers |
| CD/DVD-player | rear side model plate | DVD/CD collection |
| iPod | front | iPod |
| Room-lighting | manually | lamp |

The picture recognition identifies:
  TV by the form, position (above a cupboard) and the logo
  Speakers by their particularities (round speakers) and the position on the ground
  CD-collection by the pattern of the stored CDs
  DVD and amplifier by the form & logo and by the position (below CD-pattern)
  The lamp because of the different form.

FIG. 5 shows an example 500 of a screen 502 of an RC 504 with a display (e.g., a touch screen) for selecting items. In case of a doubtful recognition, the RC 504 displays an image 506 of a camera's view (e.g., the view the camera had when pointing and using a command). Because of possible ambiguity in recognition, it proposes two or more possibilities with a box around the choices 508, 510. A user can then decide which apparatus is to be controlled. If it is a simple display, keys 512 (e.g., that might have the respective color) can be used to evaluate the correct box 508, 510. In the case of an RC with a touch screen, the respective box can be touched for selection.

For further convenience, it is useful to have some kind of a "hold" mode. This means, that the remote control can be switched to the "hold" mode where it remembers the last controlled device. Commands that follow can be sent to the same device without having to point directly to the device again and again. For example, if one is listening to his/her mp3-collection in a random manner, he/she probably want to often skip some songs while having the remote control pointing in any direction. This is especially true for Wi-Fi and/or Bluetooth remote controls. This "hold" mode can either be triggered by a button and/or by just using the last recognized device. When the remote control is pointing, for example, to a couch that is not assigned to a device, it automatically takes the previously recognized device.

Figure 6:
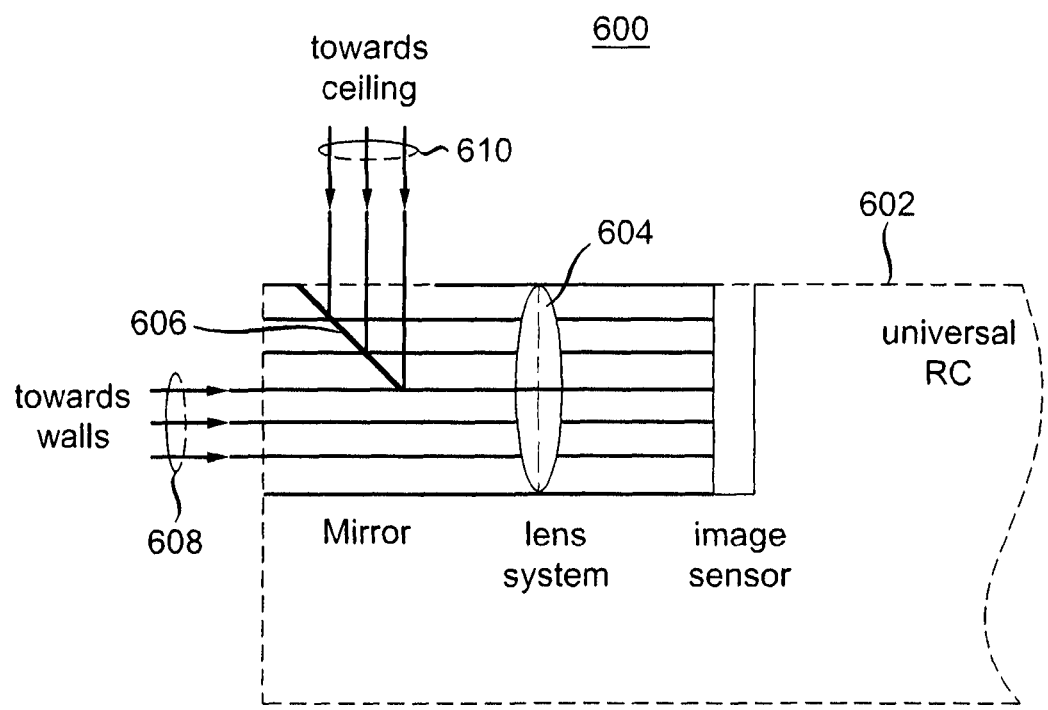
FIG. 6 is an example of an alternative embodiment of a remote control with multiple views.

In a more advantageous scenario, the RC is able to detect a room automatically when placed in the room. It then can offer a choice of commands useful in that particular room when pointing at objects. The room recognition is accomplished by systematically taking images when the RC is placed in a room. Those photos are triggered by a built-in accelerometer, timer and/or manually and the like. The image content can be walls, furniture and/or the ceiling, etc. By using a wide-angle lens, even a ceiling can offer many recognizable and distinguishable objects. For that reason, a second image device can be utilized. Alternatively, an RC 602 with a lens 604 pointing forward can be extended by a mirror 606 splitting a view in a forward path 608 and a ceiling-path 610 (i.e., a path approximately 90 degrees to the first view) as illustrated in the example 600 of FIG. 6. With either an additional image device and/or additional mirrors, a stereoscopic image is also possible. Stereoscopic images have the advantage of better ranging and better detecting of different objects (that are allocated to apparatuses). Location information can also be supported by other sources like WLAN hot-spots, GPS, etc. and/or information given by an accelerometer, gyroscope and/or time, etc.

These techniques allow the RC to present a room dependent menu. This allows, for example, if you are indisposed in a room without devices to be controlled and cannot see a television in another room but can hear it, to control the volume without pointing the remote control because the RC has already detected the room you are currently in and knows that there is nothing else to be controlled. It is clear that for certain distances and/or different rooms an appropriate communication path is chosen (e.g., IR and/or RF). In addition, the attitude (space angle, detected by accelerometer and compass) can be used for allocation to a device— and/or for the support of the allocation. As an example, pointing downwards means the audio equipment near the floor, pointing to the ceiling controls the lighting and/or pointing in a compass-direction together with a place can address a particular device (and/or the allocated target).

What has been described above includes examples of the embodiments. It is, of course, not possible to describe every conceivable combination of components or methodologies for purposes of describing the embodiments, but one of ordinary skill in the art can recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A remote control device for controlling a remotely controllable device, comprising:
    an image obtaining device configured to obtain at least one image associated with a remotely controllable device;
    at least one processor configured to identify the remotely controllable device based on the at least one image obtained by the image obtaining device;
    said at least one processor being further configured to program the remote control device for controlling the remotely controllable device when said remotely controllable device is identified by said processor based on said at least one image;
    said at least one processor being further configured, if said remotely controllable device is not identified based on the at least one image obtained, to transmit different power-on control command codes to said remotely controllable device until it is detected from at least one image of the remotely controllable device taken by the image obtaining device and image recognition is made that a transmitted power-on control command code turned on the remotely controllable device and to program the remote control device for controlling the remotely controllable device when said remotely controllable device is identified by said processor based on a the transmitted power-on control command code that turned on the remotely controllable device.

2. The remote control device of claim 1, wherein the at least one processor is further configured to interface with a database to identify the remotely controllable device, the database containing image related information of remotely controllable devices.

3. The remote control device of claim 1, wherein the database resides external to the remote control device.

4. The remote control device of claim 1, wherein the at least one processor is further configured to use a pattern found in the at least one image to identify the remotely controllable device.

5. The remote control device of claim 1, wherein the remote control device comprises a mapping mode enabling a user to pair an image of an object in a room with a remotely controllable device, said object being one of a picture on a wall, a cupboard, a scenery or a TV newspaper.

6. A method of programming a remote control device for controlling a remotely controllable device, said method being implemented by a remote control device, said method comprising:
  obtaining, from at least one image obtaining device in said remote control device, at least one image associated with the remotely controllable device;
  identifying the remotely controllable device based on the at least one image obtained;
  if said remotely controllable device is identified based on the at least one image obtained, programming the remote control device for controlling the remotely controllable device based on said at least one image;
  if said remotely controllable device is not identified based on the at least one image obtained, transmitting different power-on control command codes to said remotely controllable device until it is recognized from at least one image of the remotely controllable device taken by the image obtaining device and image recognition is made that a transmitted power-on control command code turned on the remotely controllable device; identifying the remotely controllable device based on the transmitted power-on control command code that turned on the remotely controllable device; and programming the remote control device for controlling the remotely controllable device when said remotely controllable device is identified by said processor based on the transmitted power-on control command code that turned on the remotely controllable device.

7. The method of claim 6 further comprising:
  processing the at least one image to determine a pattern in the at least one image associated with the remotely controllable device.

8. The remote control device of claim 1, wherein the at least one image is an infrared image.

9. The method of claim 6, wherein the at least one image is an infrared image.

\* \* \* \* \*